March 21, 1967 E. P. SKOV 3,310,637

MAGNETIC REPRODUCE HEAD USING NEGATIVE FEEDBACK TO OBTAIN MAXIMUM MID-BAND RESPONSE

Filed Sept. 4, 1962 4 Sheets-Sheet 1

ERLING P. SKOV
INVENTOR.

BY Nathan N. Kallman

ATTORNEY

March 21, 1967 E. P. SKOV 3,310,637
MAGNETIC REPRODUCE HEAD USING NEGATIVE FEEDBACK TO OBTAIN
MAXIMUM MID-BAND RESPONSE
Filed Sept. 4, 1962 4 Sheets-Sheet 2

ERLING P. SKOV
INVENTOR.
BY Nathan N. Kallman
ATTORNEY

March 21, 1967 E. P. SKOV 3,310,637
MAGNETIC REPRODUCE HEAD USING NEGATIVE FEEDBACK TO OBTAIN MAXIMUM MID-BAND RESPONSE
Filed Sept. 4, 1962 4 Sheets-Sheet 3

ERLING P. SKOV
INVENTOR.
BY Nathan N. Kallman
ATTORNEY

ERLING P. SKOV
INVENTOR.

BY Nathan N. Kallman

ATTORNEY

United States Patent Office 3,310,637

Patented Mar. 21, 1967

3,310,637

MAGNETIC REPRODUCE HEAD USING NEGATIVE FEEDBACK TO OBTAIN MAXIMUM MID-BAND RESPONSE

Erling P. Skov, San Mateo, Calif., assignor to Ampex Corporation, Redwood City, Calif., a corporation of California Filed Sept. 4, 1962, Ser. No. 221,217
3 Claims. (Cl. 179—100.2)

This invention relates to systems for reproducing signals recorded on a magnetic medium and, more particularly, to systems for reproducing signals from a magnetic medium with low noise, superior equalization and minimum distortion.

Magnetic recording and reproducing systems have been widely adopted for a great variety of applications in which they are superior to other signal reproducing systems in cost, simplicity and ease of handling. They are employed, for example, for extremely wide band uses such as television program recording, and in a wide range of other applications that may involve complex multifrequency waves or digital signals and represent instrumentation or process data of virtually every conceivable form. The present invention is primarily concerned with magnetic recording and reproducing systems that operate within given frequency bands with complex multifrequency waves, and is particularly described with reference to audio recording systems, but systems and circuits in accordance with the invention are of general application and should not be considered to be limited in purpose or function to those examples given.

The use of magnetic mediums and magnetic devices for the recording and reproduction of information overcomes many of the limitations that are imposed by other storage and reproduction systems. The advantages are such, in fact, that the most serious limitations encountered in the reproduction of signals from a magnetic medium are those introduced by noise and distortion. Noise is contributed principally from three different parts of the reproducing system. The magnetic medium itself, usually a tape, introduces some noise effects into a reproduced signal. Magnetic heads and associated input transformers cannot be made free of resistive characteristics and accordingly independently contribute noise to a reproduced signal. Finally, amplifier devices inherently have their own noise characteristics and constitute a third independent source of noise.

The signal derived from a playback head rises linearly with increasing frequency in the well-known 6 db per octave slope to a frequency at which the playback means resonates. The component values that establish this resonant frequency include not only the head inductance but the winding capacitance of the head as well as the lead capacitance and input capacitance of the associated preamplifier circuits. At such resonant frequency, the signal frequency response and noise frequency response both provide maximum output.

The signal-to-noise ratio of a reproducing means is determined in most applications, for a given signal output, by amplifier noise, which itself consists of two primary components. One of these components, the white noise is substantially constant as a function of frequency, and the other, the I.F. noise decreases in level with increasing frequency at a rate of 3 db per octave. In the audio frequency band, the dominant noise factor across most of the band will very often be the white noise, and it is evident that a reduction in amplifier noise will provide important advantages for reproducing systems. This is particularly true because of modern trends toward the reduction of track width with tape systems, and because of improvements in the noise characteristics of the tapes themselves. Reduction in tape noise concurrent with a reduction in track width (which necessarily decreases the signal output) make imperative the reduction of noise from both the playback head and the associated amplifier.

Accommodation for noise factors in the system is necessarily affected by the need for equalization which arises from the varying frequency responses encountered in magnetic reproduce systems. Because the predominant factor which affects the reproducing system output signal is the 6 db per octave variation in head output response, and because this variation is relatively easy to equalize, if it is uniform across a band, prior art systems have usually placed the head resonance outside, but near the upper limit of, the recorded frequency band. This, however, sacrifices signal within the useful band, and it also sacrifices the possibility of being able to tailor the signal-to-noise ratio distribution with frequency for specific applications. With audio systems, for example, it is desirable to place the maximum signal-to-noise ratio at the point of maximum aural sensitivity, which is in the 3 to 5 kc. region. Although the head resonance frequency might be changed relatively easily by modifying the input transformer or the winding of the playback head itself, such placement of the frequency would markedly increase prior art equalization problems because the 6 db per octave variation would reverse at the head resonance frequency. It is therefore most desirable to provide a means of equalizaiton for reproducing systems which is not critical as to whether head resonance is inside or outside the recorded frequency band. A related feature of importance is that the equalization means should not add noise to the system. Equalization by means of a simple parallel damping resistor, for example, is relatively straightforward but adds the thermal noise of the resistor to the system, essentially defeating the objective of obtaining a low noise system.

Equalization for varying responses should also be accomplished in such fashion as to minimize distortion effects. To compensate for the 6 db per octave slope of the playback head output signal with frequency, the reproduce amplifier system must incorporate a reverse frequency response characteristic in order that the desired flat overall frequency response characteristic can be achieved. Amplifying devices are not, however, inherently linear and thus they produce non-linear distortion of the recorded signal. Inasmuch as most of these systems utilize complex multifrequency waves, and because of the higher signal levels at the upper ends of the frequency band, the most serious distortion is encountered in the higher frequency signals. These are not necessarily detrimental to system performance, however. Harmonic distortion products, for example, will normally be outside the recorded frequency band. The intermodulation distortion arising from the creation of several orders of sum and difference tones from the different frequency components of the multifrequency waves may, however, provide significant components within the recorded frequency bands. The sum tones may again be outside the frequency bands, but the difference tones may be particularly troublesome because they may fall in the frequency region which is most highly amplified as a result of the operation of the equalization circuits of the system. If, for example, two frequencies near the upper end of a recorded audio frequency band are recorded simultaneously (at 15,000 c.p.s. and 15,050 c.p.s., for example), the difference tone will be 50 c.p.s. If, as in prior art systems, the equalization is located in the subsequent amplifier stages following the first amplifier stage, this undesired 50 c.p.s. component is greatly amplified by the equalization network relative to the high frequencies and can constitute a considerable amount of distortion. Placement of the equalizing network prior to the first amplifying stage is not a satisfactory solution with prior art systems, because of the consequent reduction of the playback signal level and thus a decreased signal-to-noise ratio.

The need for a low noise amplifier, and its potential usefulness in a wide range of applications, is generally apparent to those skilled in the art. For magnetic reproducing systems, however, particular benefits can be achieved by superior low noise amplifier designs, because of the fact that amplifier noise has been the controlling factor throughout most of the recorded frequency band. Increasing the Q of the playback means increases the signal and noise both, but increases the signal more than the noise. With the head resonance frequency placed outside the recorded frequency band, however, most of the signal-to-noise ratio improvement is wasted. In accordance with the present invention, as described below, the resonant point of the playback means can be placed within the recorded frequency band so that the maximum obtainable signal-to-noise ratio can be fully utilized. The signal output therefore reaches a peak somewhere within the recorded frequency band, and decreases on both sides on the frequency scale. With substantially a constant amplifier noise, these decreasing signal outputs in the upper and lower ranges mean reduced signal-to-noise ratio in these frequency regions. If amplifier noise is brought below head noise, however, advantage is taken of the fact that the head noise curve decreases at the upper and lower regions of the frequency band on both sides of the peak, in a fashion corresponding to the signal output curve.

In accordance with the invention, particular circuit configurations are utilized requiring an amplifier that maintains the desired low noise characteristic, but has high gain and a specified phase shift relationship between a feedback signal and the input signal. The amplifier should be such as to avoid instability at any frequency. Further, it will be particularly advantageous for the amplifier arrangement to be arranged to compensate for certain variations in frequency response at both low and high frequencies.

It is therefore an object of the present invention to provide low noise systems for reproducing magnetically recorded signals.

Another object of this invention is to provide improved magnetic reproducing systems having high signal-to-noise ratios across an entire frequency band of recorded signals.

A further object of this invention is to provide magnetic reproducing systems utilizing a maximum signal-to-noise ratio at a selected region within a recorded frequency band.

A further object of this invention is to provide a magnetic reproducing system in which equalization is essentially independent of head resonance frequency.

A further object of the present invention is to provide means for equalizing magnetic reproducing systems without the introduction of added noise.

Yet another object of the present invention is to provide an improved magnetic reproducing system which has a minimum of difference tone distortion.

Still another object of the present invention is to provide improved equalizing arrangement for reproducing systems, which equalizing arrangement involves a minimum of difference tone distortion.

Another object of the present invention is to provide an improved low noise amplifier arrangement.

A further object of the present invention is to provide a high gain, low noise amplifier having phase stability.

Briefly, these and other objects of the present invention are provided by reproducing systems employing an integral combination of reproducing head and preamplifier, with feedback, to provide low noise signals and having minimum distortion. The arrangement is such that the reproducing head circuit may be tuned to resonate within the frequency band of the recorded signals, at a desired frequency. The arrangement further permits the use of reproducing head circuits that have a high figure of merit (Q). The signals derived by the reproducing head circuit are amplified with a high gain, low noise and phase stable circuit in accordance with the invention, and a negative feedback signal is coupled to the reproducing head circuit to provide a substantially noise-free resistive damping of the reproduced signal. The high gain or amplification and the high negative feedback directly to the reproducing head circuit of this arrangement provide signal reproduction with low noise, minimum distortion and flat frequency response across the entire frequency band.

In one specific system in accordance with the invention, a high Q reproducing head circuit is obtained by using an appropriate low loss head material and increasing the number of turns of the pickup coil. The reproducing head circuit is tuned to a point wthin the frequency band of the recorded signals, and the signals derived by the head circuit are coupled directly or through a transformer to a high gain, low noise amplifier. The amplifier includes a first stage providing a phase inversion of the input signals and a second stage providing further amplification with negligible phase shift. The resulting signals are applied at a system output terminal and are also returned as negative feedback signals to the reproducing head circuit. This arrangement permits the head resonance frequency to be at a selected point within the useful frequency band, thus providing maximum signal-to-noise ratio at a point of maximum aural sensitivity (3 to 5 kc.) for audio systems, as one example.

This employment of feedback directly to the head provides a number of additional features, including frequency compensation prior to amplification. Intermodulation distortion and particularly difference tone distortion are kept at a minimum because the difference tone components at the lower region of the frequency band are not amplified out of proportion to other signal components. The system therefore provides, in addition to freedom as to selection of head resonance frequency, advantages in equalization, and minimum distortion.

Amplifier circuits in accordance with the invention operate with exceptionally low noise as well as high gain and phase stability. The amplifier circuits are used in high transconductance states to provide low noise, and may incorporate means in the feedback circuit for compensating for variations at the high and low ends of the frequency band. Both two-tube and three-tube circuit arrangements having these characteristics are provided in accordance with the invention. Such amplifiers provide adequate gain and a correspondingly high proportion of feedback to permit the use of high Q playback heads.

A better understanding of the invention may be had by reference to the following detailed description, taken together with the accompanying drawings, in which.

Reproducing systems as described herein may be employed for any frequency range encompassed by magnetically recorded signals. They may function in the audio range, for example, from about 50 c.p.s. or below to about 15,000 c.p.s. or above. The invention is principally described in the context of audio systems, because low noise in audio reproduction is particularly desirable. The invention may, however, be applied with equal facility to other direct record systems.

Figure 1:
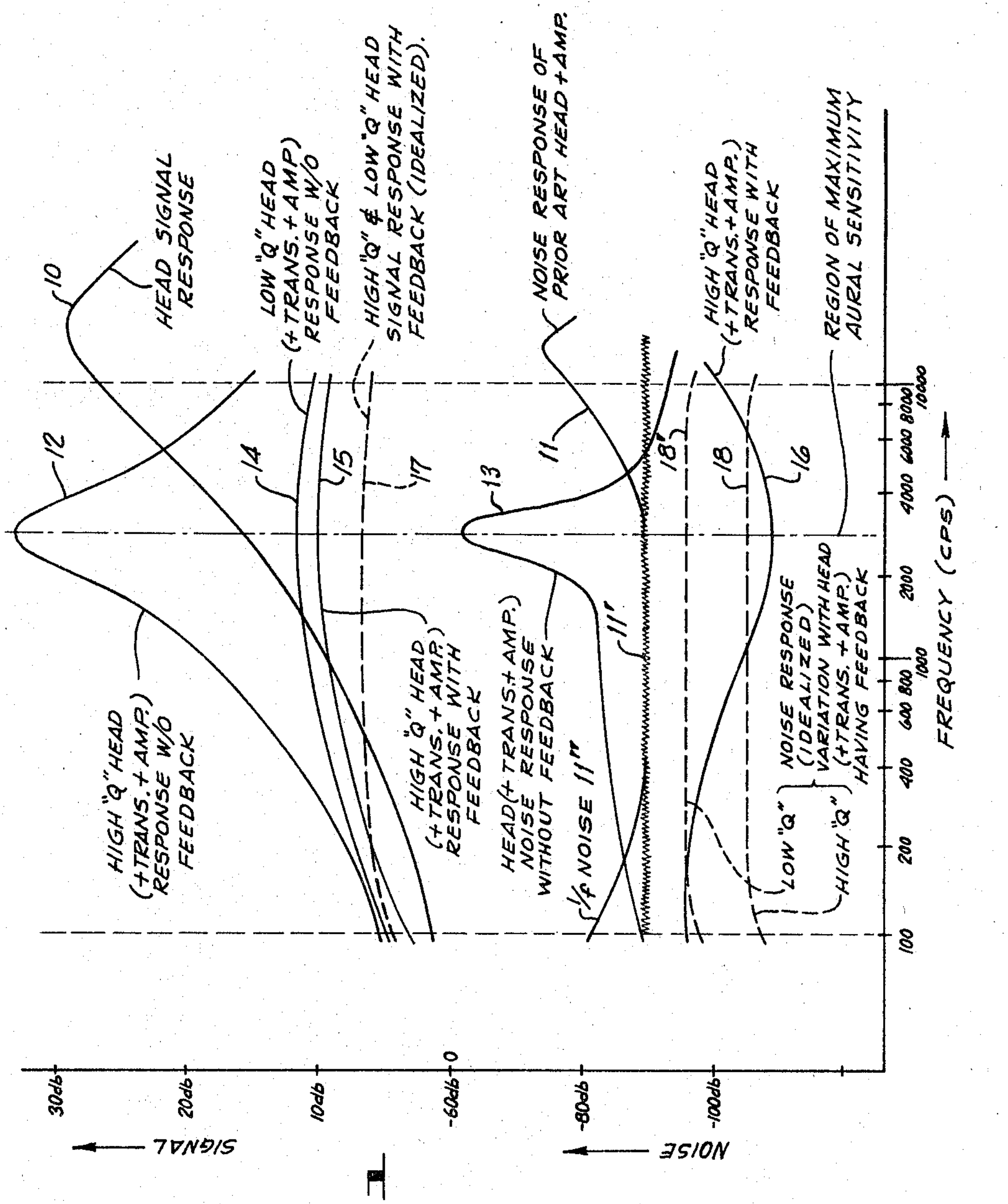
FIGURE 1 is a diagram contrasting the characteristics of reproducing systems from magnticaIly recorded signals in accordance with the invention with characteristics of systems in accordance with the prior art.

The typical reproducing head circuit has an impedance characteristic approximating that of a circuit comprising a resistor, an inductor, and a capacitor connected in parallel. If the components of the reproducing head circuit are chosen so that the circuit resonates near the upper frequencies of the audio frequency band, for example, the reproducing head circuit will have a substantially linearly increasing (6-db-per-octave) frequency response within the audio frequency band. FIGURE 1 illustrates on a logarithmic frequency scale both the signal response (taken from a base of 0 db) and the noise response (taken from a base 60 db lower) of various prior art reproducing circuits and circuits in accordance with the invention. In FIGURE 1, a curve 10 is shown that represents the signal response for prior art reproducing head circuits tuned to resonate just above the audio frequency band. Here, for convenience only, the audio band is shown as extending from 100 to 10,000 cycles per second although it is conventionally regarded as wider with high fidelity and professionally used systems. The curve 10 shows the substantially constant increase in signal response with this placement of head resonance frequency, and the reproduced signals may be compensated readily by using amplifying circuits having complementary response characteristics.

However, the signal generated by the typical prior art reproducing head at the lower frequencies is relatively small. Such factors place significant limitations on the noise reductions that are feasible with prior art systems. Consider, for example, the noise response of a typical prior art head and amplifier reproducing circuit combination. This noise response is represented by a composite of three curves 11, 11' and 11'' respectively. At the higher frequencies within the audio band the curve 11 represents the noise response of the head and predominates because it exceeds the tube shot noise level 11', which is substantially constant with frequency. In this high frequency region, the signal and noise responses increase approximately the same amounts, but because the head resonance frequency is outside the useful band for equalization purposes most of the potential improvement in signal-to-noise ratio is lost. In the intermediate frequency regions, the tube shot noise level curve 11' exceeds the other noise contributions, so that the signal-to-noise ratio decreases with frequency at a substantially constant rate in this intermediate frequency region. The decrease in signal-to-noise ratio becomes even sharper at the lowest frequencies at which signal response approaches its minimum. This is evident because of the curve 11'' which represents the frequency dependent noise (flicker noise, semiconductor noise, current noise), and which rises in level with decreasing frequency at a rate of 3 db per octave. Thus, in accordance with prior art techniques, noise components may constitute a substantial proportion of the total reproduced signal, and particularly at the lower frequencies of the band. Reductions in the noise components by the use of individual prior art techniques would not, in all likelihood, provide the measure of increased performance desired for modern systems.

It is well undertood that the noise produced by a reproducing head is due to the real part of its impedance, that is, its resistive components. A high signal-to-noise ratio may be realized by increasing the "figure of merit" of the reproducing heat at resonance. The "figure of merit" or Q of the circuit, defined as the relative efficiency of the circuit as measured by the proportion of energy stored to the amount of energy dissipated at resonance, may be increased by increasing the inductance of the reproducing heat at resonance with respect to the series resistance. In addition, the input transformer or the head winding might be varied to shift the frequency of resonance. Such changes in the head resonance frequency might be effected to place the frequency within the frequency band of the recorded signals so as to derive the benefit of the increased signal-to-noise ratio in the region of head resonance frequency.

Prior to the present invention, however, it had been considered that high Q reproducing heads would unduly modify the bandwidth of the reproducing system. In addition, it was considered that placement of the resonance point within the band (whether or not a high Q head was used) would unduly complicate the equalization problem for all practical applications. The increase in signal and noise and the nature of the equalization problem are illustrated by the curves 12 and 13 of FIGURE 1, which correspond to the signal and noise outputs, respectively, for a high Q reproducing head and associated circuits. Both the signal response curve 12 and the noise response curve 13 have sharper peaks than the corresponding curves 10, 11 of prior art systems the decrease in slope on both sides of the peak of the signal output indicate that the associated amplifier circuits must perform a complex equalization function in order to provide the desired overall flat response. As pointed out above, equalization systems of the pior art would either add noise or would be unduly complex. The use of lower Q heads is not a solution, because, as shown by curve 14, the lowering of the Q makes the signal response broader, and lowers the peak, while the low Q head is at the same time noisier than the high Q head.

Systems in accordance with the present invention may, however, place the head circuit resonance frequency within or outside the frequency band of the recorded signal, at the option of the system designer. System performance may then be tailored to provide maximum signal-to-noise ratio at a given frequency, for example, and the benefits are derived with an integral equalization arrangement which is both simple and substantially noise-free, irrespective of the placement of the head resonance frequency. Further, the arrangement is such that it provides equalization prior to substantial amplification, and permits operation with minimum distortion.

The intermodulation distortion components, referred to above as difference tone distortion and of most concern here are referred to here as CCIF-IM distortion by some workers in the art. CCIF-IM distortion is defined by Terman and Pettit in the book "Electronic Measurements," 2d edition, pages 338 to 339 as follows:

Intermodulation distortion (CCIF method), percent $$\frac{Ed}{E_a+E_b}\times 100$$

where $E_d$ is the difference frequency voltage and $E_a$ and $E_b$ the voltages of the two test signals.

Figure 2:
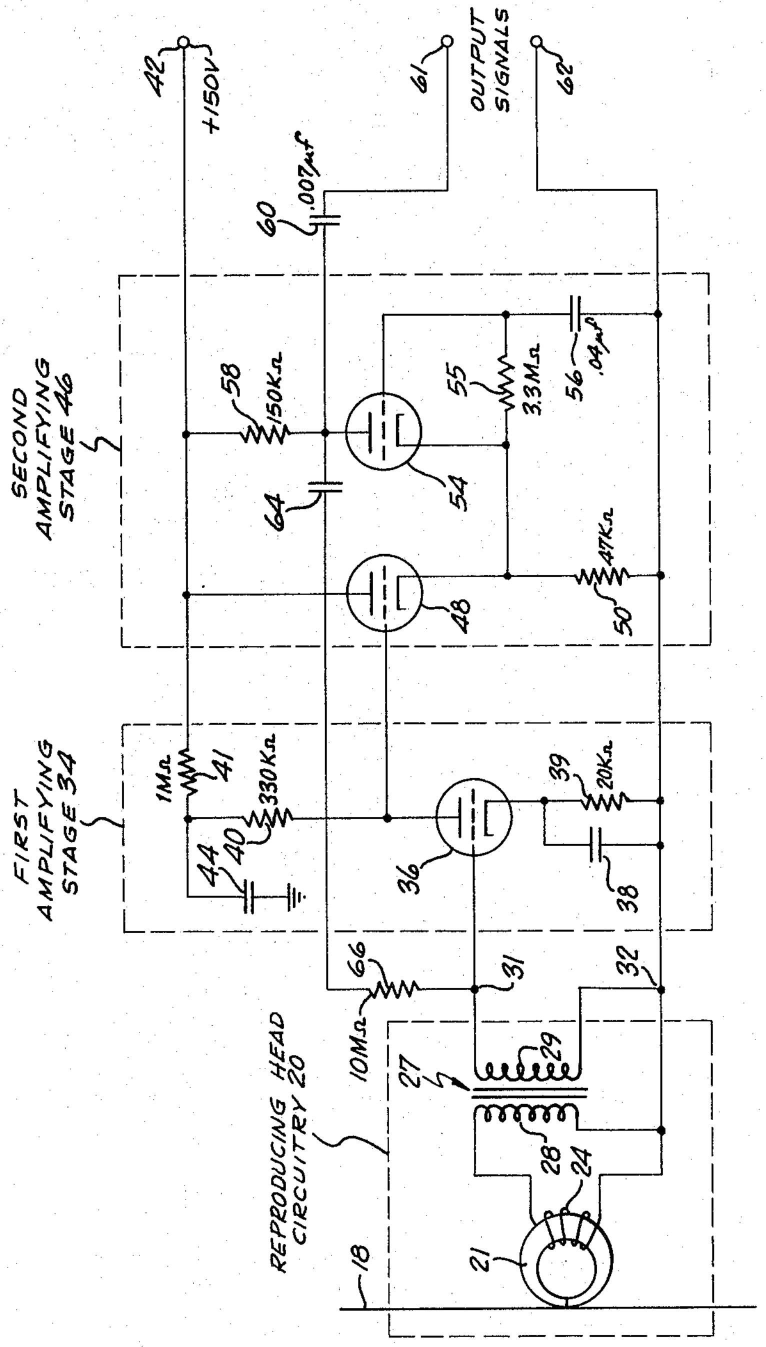
FIGURE 2 is a schematic diagram of a reproducing system in accordance with the invention utilizing a three-tube amplifier circuit in accordance with the invention.

One exemplary system in accordance with the invention is shown in schematic form in FIGURE 2. The reproducing system disclosed includes a reproducing head circuit 20 and an integral amplifying arrangement, which together provide a unified head-preamplifier system.

The reproducing head circuit 20 includes a reproducing or playback head 21, which is positioned to sense signals magnetically stored on a moving magnetic tape 18. The playback head 21 may be of conventional construction and having two core halves and a pickup coil 24 in which electrical signals are induced in response to the flux changes sensed by the head 21. The dimensions of the material used in the head 21, and the number of turns in the pickup coil 24 both affect the frequency at which the reproducing head circuit 20 will resonate, and the Q of the circuit at the resonance frequency. The signals induced in the pickup coil 24 are applied to a transformer 27 at a primary winding 28 and a pair of output terminals 31 and 32 of a secondary winding 29. The transformer 27 forms part of the reproducing circuit 20 as does the input impedance of the succeeding first amplifier stage. When selecting the resonance frequency of the reproducing head circuit and when setting the Q of the circuit 20, these various factors should be considered. To raise the Q of the circuit 20, the number of turns of the pickup coil 24 may be increased, and the resistance may be reduced by the use of heavier wire, although it is particularly effective to use a low loss core material such as ferrite. In addition, for high Q, the transformer 27 should have low loss core material and windings. When adjusting the resonance frequency of the reproducing head circuit 20, by increasing the number of turns, for example, the input capacitance of the first amplifier stage should be considered in addition to the characteristics of the pickup head 21 core, the coil 24, and the transformer 27.

For an audio system, this arrangement is such as to permit the head resonance frequency to be placed at the region of maximum ear sensitivity for best signal-to-noise ratio. This has been found to correspond to a value of 3 to 5 kilocycles per second. It should be borne in mind that for convenience the selected frequency may be referred to as "within" or "intermediate the ends of" a selected frequency band. This is not intended to connote that the frequency is located at a precise arithmetic center or logarithmic center within the selected frequency band, although such values may be used.

The signals appearing at the terminals 31 and 32 of the transformer 27 are applied as input signals to a first amplifying stage 34 which operates as a relatively conventional anode follower with a relatively high input resistance. The first amplifying stage 34 is shown to include a triode tube 36, although a tetrode, pentode or any other grid-controlled tube type may be employed. It is preferred to employ tubes of the types now available which have low 1.F. noise, such as those sold under the trade name "Nuvistor." Such tubes may be operated at high anode currents and high plate voltages to insure high transconductance operation essential to low noise performance (the shot noise being inversely proportional to transconductance).

The grid of the tube in the first amplifying stage 34 has its grid connected to the terminal 31 of the transformer 27, its cathode connected by a shunt arrangement including a capacitor 38 and a resistor 39 to the terminal 32, and its anode coupled by resistors 40, 41 to a source of positive potential 42. A capacitor 44 connects the junction between the resistors 40 and 41 to ground. The first tube 36 forms a Class A amplifier, and signals appearing across the terminals 31 and 32 are shifted in phase by 180°.

The phase shifted signals derived from the plate terminal of the tube 36 are applied to a second amplifying stage 46. The second stage 46 includes a tube 48 (shown as a triode) having its grid connected directly to the anode of the first triode 36, its cathode connected by a resistor 50 to the terminal 32 of the transformer 27, and its anode connected directly to the source of positive potential 42. The second tube functions as a cathode follower circuit with the high input impedance-low output impedance and low phase shift characteristic of such circuits.

The signals appearing across the cathode resistor 50 of the second amplifier are applied to a third triode 54 having its anode connected by a resistor 58 to the source of positive potential 42, its grid connected by a capacitor 56 to the terminal 32, and its cathode connected directly to the cathode of the second tube 48 and by a resistor 55 to the grid of the second tube 48. Output signals are derived from the second amplifying stage 46 at a pair of output terminals 61, 62. The terminal 61 is coupled to the anode of the third tube 54 through an output capacitor 60, and the terminal 62 is connected directly to the terminal 32. The third tube 54 is thus arranged to operate as a grounded-grid, cathode-input amplifier, displaying the low input impedance and low phase shift characteristics of such an amplifier.

The second amplifying stage essentially has a high-gain characteristic but with negligible phase shift. Furthermore, the low output impedance of the second tube 48 and the low input impedance of the third tube 54 reduce the effects of the shunting capacities of the tubes so that the response of the amplifier is substantially linear over an extremely wide frequency range.

Thus the signals derived by the reproducing head circuit 20 and applied as input signals to the first amplifying stage 34 are first amplified while undergoing a constant phase shift of 180°. The phase shifted signals are again amplified by the second amplifying stage 46 and appear after high gain amplification at the output terminal 61 while remaining shifted in phase by a constant 180°. The signals may then be used directly for negative feedback for the reproducing head circuit 20. To this end, a capacitor 64 and a resistor 66 are connected in series between the terminal 31 and the anode of the tube 54. This direct coupling of out-of-phase components is arranged to return a high proportion of the output signal to the reproducing head circuit 20. In an exemplary system having the circuit values shown in FIGURE 2, the amplifying stage is provided approximately 59 db of gain, the feedback circuit return approximately 55 db at head resonance, and the output signal appearing at the terminal 61 was thus amplified by substantially 4 db over the input signal at the head resonance frequency.

Systems in accordance with the present invention provide a number of concurrent advantages over prior art systems, all of which reside in the integral disposition and use of the various elements of the system. All of the elements may now be chosen for low losses and therefore for low noise. With respect to the playback head itself, appreciable gains in noise performance are feasible because it is now possible to increase the Q of the playback head thus increasing the signal without proportionately increasing the noise. Furthermore, because the head resonance frequency can be placed within the useful frequency band, an improvement in signal response in the region of the head resonance frequency is fully utilized. These factors are illustrated by the idealized performance curves 17 and 18 in FIGURE 1. The idealized signal response curve 17 for a high Q reproducing head circuit including feedback is substantially uniform across the frequency band. The noise response curve 18 under the same conditions is also substantially constant across the frequency band and is very low. A decrease in the Q of the circuit has the effect of increasing the noise response for constant signal response, as shown by curves 17 and 18'.

Actual curves for the arrangement of FIGURE 2 illustrate another of the advantages of the invention. The head resonance frequency is placed in the region of approximately 3 kc. per second, which is the region of maximum aural sensitivity. Accordingly, a low signal response has a flattened peak in this region, as shown by curve 15, the noise response is at a minimum in this region, as shown by curve 16. This is, of course, the effect desired for audio systems. The configuration of these curves 15, 16 also illustrates the fact that wideband performance is being achieved, with a superior signal-to-noise ratio across the entire selected frequency band. If a substantially constant signal-to-noise ratio in a given frequency band is desired, the head resonance should be placed midband on a logarithmic scale. Thus, for a frequency band which is 4 decades wide from 30 cycles per second to 300 kc., a head resonance frequency of 3 kc. would be selected. Although, as is well known, the frequency response limitations of magnetic heads and tape at extremely high recording frequencies (in the megacycle range) become appreciable, the principles of the present invention are still useful.

Another factor which contributes to the low noise performance is derived from the nature of the equalizing signal which is used. The equalization is effectively accomplished by the feedback signal, which acts directly at the head circuit to provide a purely resistive, but essentially noise-free, effect. This is true because the feedback signal affects signal and noise in equal proportion, and does not increase the noise proportion, as simple parallel resistor would. Stated in another way, the noise and amplification of the amplifier stages are reduced by the same ratio due to the action of the feedback and the signal-to-noise ratio is unchanged, so that no noise is added.

The system provides another important advantage with respect to equalization and distortion. Because the equalization is introduced directly at the head, prior to the first amplifying stage, distortion is minimized on amplification because the signal which is to be amplified has a flat frequency characteristic. In prior art systems, the introduction of an equalizing network prior to the first amplifying stage acts to reduce distortion, but also acts to reduce the signal level into the first amplifying stage, so as to increase the signal-to-noise ratio. The present invention, however, not only avoids a decrease of the signal-to-noise ratio but also provides a minimum of difference tone distortion. In the example previously given, of difference tones of 50 c.p.s., generated as a result of the beating of a 15,000 c.p.s. with a 15,050 c.p.s. signal, the difference tones with prior art systems might have to be amplified in such manner as to introduce a high degree of distortion. As a typical example, 50 c.p.s. components may constitute about 1% of the level of the high frequency components at the output of a first stage, before equalization. After equalization the 50 c.p.s. components will typically have been increased to 30% because it will be necessary to emphasize the 50 c.p.s. components by approximately 32 db over higher frequency components. This high degree of difference tone distortion is avoided by systems in accordance with the present invention, because equalization is effected prior to the amplification. The employment of the combined head-preamplifier combination may be visualized as flattening the frequency response characteristics of the head itself.

It should also be noted that the high gain, low phase shift amplifier disclosed in accordance with the invention provides an unconditionally stable performance. Although a high degree of feedback, usually in excess of 40 db which is employed to flatten the peaks of the signal and noise curves, the gain is maintained in excess of unity, without unwanted phase shift at any frequency.

Figure 5:
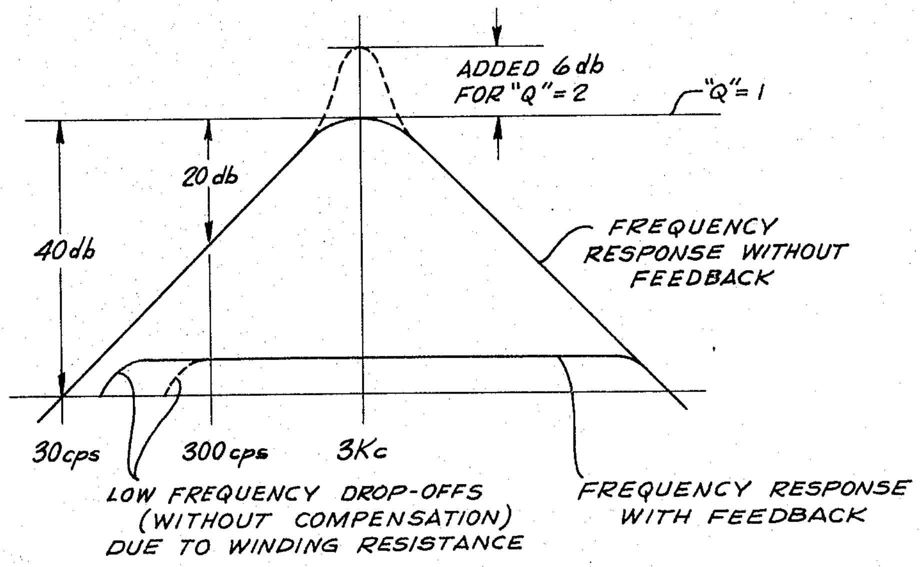
FIGURE 5 is a chart of signal response versus frequency which is useful in illustrating the relationship between the Q of the playback head and the amount of signal feedback in the amplifier circuits.

Amplifier circuits in accordance with the invention are independently useful as low noise amplifiers, but in addition have particular significance in magnetic reproducing circuits. The need for high gain, as well as phase stability, is evident from the diagram of FIGURE 5, which illustrates the change in gain which is needed when the Q of the head is increased. FIGURE 5 diagrammatically illustrates the amount of feedback needed for varying values of Q in a typical audio application. Assuming that the head resonance frequency is at the 3 kc., and the lower frequency limit of the recorded band is 30 c.p.s., there will be a total difference of 40 db in the signal response within the band (20 db per frequency decade), thus making 40 db of feedback necessary, assuming that the Q of the reproduce head is equal to unity. For higher values of Q 6 db of gain must be added for each doubling of Q. As shown, the signal peak at head resonance is 6 db higher for a Q equal to 2. These values represent the amount of feedback, so that the amplification which is provided must exceed such values. At all times, the phase must be such as to prevent instability at any frequency.

Figure 3:
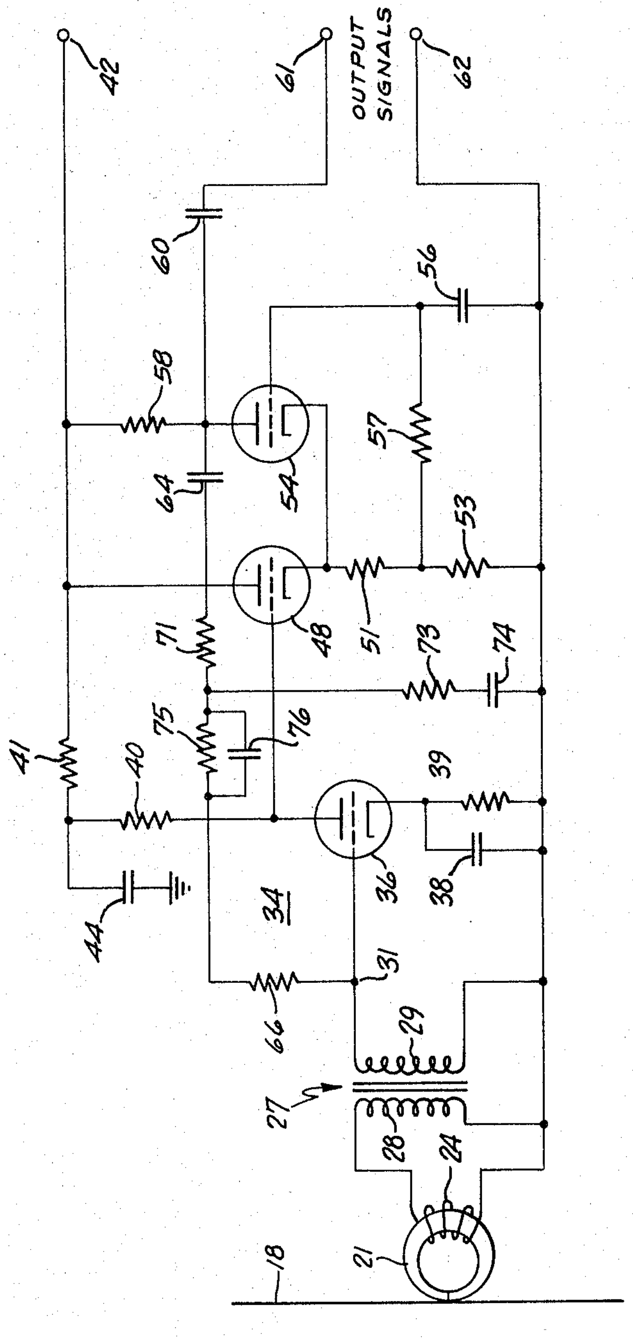
FIGURE 3 is a schematic diagram of another reproducing system in accordance with the invention that utilizes a three-tube low noise amplifier circuit having frequency compensation in accordance with the invention.

FIGURE 3 is a schematic drawing of another system in accordance with the invention, which is similar to that of FIGURE 2 except that it provides an additional capability for frequency compensation. The circuit includes a playback head 21 and a coupled transformer 27 from which input signals are applied to a first amplifying stage 34. The first stage 34 is substantially identical to that shown in the circuit of FIGURE 2. The output signals produced at the anode of the tube 36 of the first stage 34 are fed to a combined amplifier including the tubes 48 and 54, also arranged substantially as shown in the circuit of FIGURE 2.

A pair of resistors 51 and 53 are connected in series between the terminal 32 and the cathodes of the tubes 48 and 54. A resistor 57 is connected between the junction of the resistors 51 and 53 and the grid of the tube 54 for controlling the grid bias voltage. Output signals produced at the anode of the third tube 54 appear between the terminals 61 and 62. Negative feedback signals are coupled from the anode of the grounded-grid tube 54 to the terminal 31 of the transformer 27 through a compensation circuit including a capacitor 64, a resistor 71, and a resistor 75 in series, and a capacitor 76 shunting the resistor 75. The junction between the shunt capacitor 76 and the resistor 71 is connected to the terminal 32 by a resistor 73 and a capacitor 74 in series.

In this arrangement, the parallel RC circuit elements 75, 76 lower the feedback to the grid of the first tube 36 at low frequencies, with less additional feedback passing through the D.C. blocking capacitor 76 relative to the constant feedback obtained through the resistor 75. The resistor 75 produces a stopping or limiting action on the amount of decrease in feedback at the lower frequencies. The shunt circuit elements 73, 74 bypass the feedback voltage to ground at high frequencies, with the element 73 acting as a limiting resistor in the bypass circuit.

The lowered frequency response at low frequencies, as shown by FIGURE 5, is principally due to the fact that the reactive part of the head impedance does not remain higher than its D.C. resistance at these lower frequencies, principally because modern head design requires extreme compactness. The lowering of the feedback at the low frequencies therefore permits the decreased frequency response in this region to be compensated for so as to tend to maintain a net flat response. At higher frequencies, signal response may be reduced by gap width, the spacing of the head from the tape, losses due to the thickness of the magnetic record surface, and other factors. These high frequency losses are concurrently compensated for by the high frequency bypass of the feedback signal. Adjustment of the feedback means may additionally be used to compensate for a number of other effects. Pre-equalization, or pre-emphasis during recording, is used to correct for certain losses in recording, such as the tape thickness loss. During reproduction, the equalization must take this pre-emphasis into account along with the primary frequency response characteristic. Compensation for pre-emphasis as well as long wavelength effects may readily be provided by circuits in accordance with the present invention. Such circuits retain the advantages of selective placement of head resonance frequency for best signal-to-noise ratio, minimum difference tone distortion, and substantially noise-free equalization. Material improvements in the noise performance are obtained. For audio applications, an improvement of 16 db and more in noise is achieved at the lower frequencies (below 1 kc.). The effects of equalization at the high and low ends of the band are to reduce the feedback, although this does not necessarily increase the noise. The noise is increased only if the amplifier contribution exceeds the head contribution.

The examples given for audio applications will be understood to be merely illustrative. Where other frequency bands are used, as where video signals are recorded, it will be desired to modify the noise response and signal response as required for that particular application.

Figure 4:
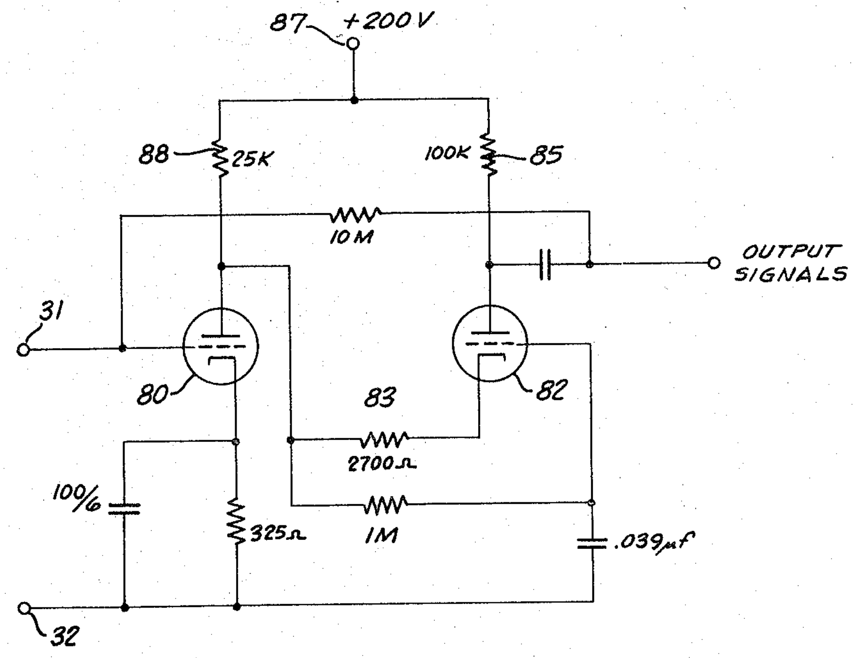
FIGURE 4 is a schematic diagram of a two-tube amplifier circuit having low noise characteristics and being of particular advantage in systems in accordance with the invention.

With reference to FIGURE 4, there is shown a preferred amplifier arrangement which uses only two tubes to provide even lower noise than the circuits of FIGURES 2 and 3, although adequate gain and phase stability are achieved. Only part of the overall playback-preamplifier circuit is shown in detail, in order to simplify the description. Specifically, high and low frequency compensation networks identical to those of FIGURE 3 may be coupled to the feedback circuit.

An input tube 80 is coupled as a phase inverter amplifier that continually conducts heavily and has high anode voltage and a low anode load resistor to obtain a high transconductance characteristic and therefore low shot noise. Input signals from the playback head are amplified with phase inversion and then are directed from the anode of the input tube 80 through a resistor 83 to the cathode of an output tube 82. This arrangement does not significantly affect the high transconductance of the input tube 80, however, because an anode load resistor 85 plus the anode resistance of the output tube 82 have an appreciably higher resistive value than the anode load resistor 88 for the input tube 80. A heavy anode current is therefore maintained through the input tube 80, independently of the operation of the output tube 82. By way of example, with a common +200 volt source 87, suitable values are 100 kilohms for the resistor 85 and 25 kilohms for the resistor 88. A resistor 83 couples the anode of the input tube 80 to the cathode of the output tube 82. The input tube 80 therefore appeared as a grounded cathode inverter amplifier and the output tube 82 appears as a grounded grid, cathode input amplifier having minimum phase shift. The negative feedback coupling is derived from the anode of the output tube 82 for return to the reproducing head circuit in the manner previously described. The high transconductance and low noise operation are again so arranged as to provide the desired gain with unconditional phase stability. The circuit provides lowest noise characteristics even though fewer active elements are used.

Thus, it has been demonstrated that the system shown in FIGURES 2, 3 and 4 utilizing high Q reproducing head circuits resonating within, or at a selected point with respect to, the recorded frequency band, and high gain amplifying and feedback means connected to the reproducing head circuits, do in fact provide high signal-to-noise ratio over an entire frequency band. The particular circuits and the component values shown for accomplishing these results are described above as examples only of the advantageous use of the invention and it will be appreciated that the invention is not limited thereto. Accordingly, any and all modifications, alterations and equivalent arrangements falling within the scope of the following claims should be considered to be a part of the invention.

What is claimed is:

1. A low noise playback system for reproducing signals recorded on a magnetic medium within a selected frequency band comprising:

a low loss playback head positioned to sense the recorded signals and having a playback winding;

a low loss transformer having primary and secondary windings, the primary winding being connected across the playback winding;

an amplifier having an input terminal connected to the transformer secondary winding and an output terminal;

the amplifier input impedance, the transformer winding impedances, the impedance of the playback winding, and the physical characteristics of the playback head and transformer having characteristics which are selected to provide a high Q sensing circuit resonating at a frequency within the selected frequency band; and means for applying a part of the signals appearing at the output terminal of the amplifier to the secondary winding of the transformer as negative feedback signals, said means including a resistor and capacitor in parallel serially coupled between said output terminal of said amplifier and said secondary winding to limit the feedback signals thereto at low frequencies of said recorded signal, said means including a second resistor and second capacitor in series coupled between said output terminal of said amplifier and ground to bypass the feedback signals at high frequencies of said recorded signal.

2. An audio system for reproducing magnetically stored signals with low noise and low distortion comprising:

means for sensing the magnetically stored signals, the sensing means being made to resonate at a selected point within the frequency band of the magnetically stored signals, and having a relatively high figure of merit;

a first terminal directly coupled to the sensing means;

low noise amplifier means having phase stability coupled to the first terminal for providing amplified signals; and feedback means for returning a substantial part of the amplified signals to the first terminal as negative feedback signals, said feedback means including low frequency feedback release means and high frequency feedback bypass means.

3. The invention as set forth in claim 2 wherein the selected point in the frequency band is within the range of 3 to 5 kilocycles per second.

References Cited by the Examiner

UNITED STATES PATENTS

| | | | |
|---|---|---|---|
| 2,649,506 | 8/1953 | Gayford et al. | 179—100.2 |
| 2,697,756 | 12/1954 | Bessire | 179—100.2 |
| 2,745,909 | 5/1956 | Anspacher | 330—100 |
| 2,803,758 | 8/1957 | Whitenack | 340—174.14 |
| 2,828,368 | 3/1958 | Wieland | 340—174.14 |
| 2,830,262 | 4/1958 | Lord | 330—100 |

OTHER REFERENCES

Mason and Zimmermann, Electronic Circuits, Signals, and Systems, John Wiley & Sons, Inc., N.Y., 1960. Pages 577–79, 583–86, 595–98, 600, 605, 609, 610.

BERNARD KONICK, *Primary Examiner.*

J. R. GOUDEAU, P. ROTH, L. G. KURLAND, *Assistant Examiners.*